United States Patent [19]

Miyake et al.

[11] 3,862,005

[45] Jan. 21, 1975

[54] PROCESS FOR PRODUCING ALDONIC ACIDS AND STARCH SUGARS CONTAINING ALDONIC ACIDS

[75] Inventors: Toshio Miyake; Yoshinori Sato, both of Okayama, Japan

[73] Assignee: Hayashibara Company, Okayama, Japan

[22] Filed: Sept. 26, 1972

[21] Appl. No.: 292,301

Related U.S. Application Data

[63] Continuation-in-part of Ser. Nos. 38,859, May 19, 1970, abandoned, and Ser. No. 43,584, June 4, 1970, abandoned.

[30] Foreign Application Priority Data

May 20, 1969 Japan.............................. 44-39005
June 6, 1969 Japan............................... 44-44370

[52] U.S. Cl................ 195/47, 195/31 R, 195/51 R
[51] Int. Cl............................................. C12d 1/02
[58] Field of Search.............. 195/47, 51, 31, 32, 36

[56] References Cited
UNITED STATES PATENTS

| | | | |
|---|---|---|---|
| 2,496,297 | 2/1950 | Lockwood et al.................... | 195/47 |
| 3,576,718 | 4/1971 | Ziffer et al............................ | 195/36 |
| 3,651,221 | 3/1972 | Conrad et al......................... | 195/32 |
| 3,669,840 | 6/1972 | Hatcher................................ | 195/36 |

OTHER PUBLICATIONS

Nishizuka et al., Journal of Biological Chemistry, Vol. 237, No. 9, (1962), p. 2721–2728.

*Primary Examiner*—Lionel M. Shapiro
*Assistant Examiner*—Thomas G. Wiseman

[57] ABSTRACT

A process is disclosed for conversion of monosaccharides, disaccharides and trisaccharides into aldonic acids by means of dehydrogenase enzyme containing cells without a hydrogen acceptor and without the nutrients and conditions necessary for cell growth. High purity maltobionic and lactobionic acids may be formed thereby during the manufacturing process of the disaccharide. Glucose, maltose and maltotriose in starch syrups of varying compositions may also be so converted to their corresponding aldonic acids.

7 Claims, No Drawings

PROCESS FOR PRODUCING ALDONIC ACIDS AND STARCH SUGARS CONTAINING ALDONIC ACIDS

This application is a continuation-in-part of both Ser. No. 38,859 filed May 19, 1970, now abandoned and Ser. No. 43,584 filed June 4, 1970, now abandoned.

This invention relates to a new process for converting sugars to aldonic acids. It further relates to a process for producing starch syrups containing large amounts of organic acids by biochemically or enzymatically oxidizing various starch syrups formed by hydrolyzing starches to different degrees, with the use of glucose-dehydrogenase, thereby oxidizing monosaccharides and oligosaccharides such as glucose, maltose and maltotriose, to gluconic acid, maltobionic acid, maltotrionic acid, etc. It also comprehends a process for high yield production of aldobionic acids with high purities from disaccharides, such as maltose, lactose, etc. by adding dehydrogenase to oxidize the reducing radicals of the disaccharides during the manufacturing process thereof or to disaccharides in solution.

Oxidation of monosaccharides such as glucose, disaccharides such as maltose and lactose and trisaccharides such as maltotriose has seldom been reported in the literature. With regard to the oxidation of glucose, electrolytic oxidation is known as is biochemical or enzymatic oxidation by glucose-oxidase. U.S. Pat. No. 2,651,592 is an example of enzymatic oxidation wherein a hydrogen acceptor is taught as being necessary.

Oxidation of disaccharides with bromine or by electrolytic oxidation is also known but many by-products are produced which reduces the yield. In 1947 F. H. Stodola et al. reported their process of biochemical oxidation in J. Biological Chemistry, vol. 171, 1947, 213 – 221. By cultivating strains of Pseudomonas genus on maltose or lactose containing mediums, they obtained aldobionic acids with yields of 75 and 77% respectively. U.S. Pat. No. 2,496,297 to the same authors also relates to the biochemical oxidation of disaccharides by fermentation with dehydrogenase containing microorganism strains.

There are many drawbacks to such fermentation processes in which the microorganism cells must be cultivated. Various nutrients and nitrogen compounds are necessary for cell growth. These impurities cause much trouble and expense during purification and lower the yield. Furthermore, secondary decomposition further reduces the purity and yield of the products. The concentration of the sugar for the mediums is also subject to restriction, thus causing economically desirable operations with higher concentrations impossible.

Nishizuka et al. have reported in J. Biological Chemistry, Vol. 237, No. 9, Sept., 1962, pp. 2721–28 an enzymatic process for the conversion of lactose to lactobionic acid. This report, however, teaches that the presence of a suitable hydrogen acceptor is necessary.

To the inventors' knowledge, nothing has been reported concerning the enzymatic or biochemical oxidation of trisaccharides.

The present invention relates to a commercial and economical method of production of aldonic acids which comprises cultivation of microorganisms that form mono-, di-, and tri-saccharide dehydrogenase on mediums containing reducing sugars, and oxidation of highly concentrated solutions which contain only disaccharides or mixtures of mono-, di- and tri-saccharides with utilization of the above-mentioned enzyme containing cells with agitation and aeration to obtain highly pure aldonic acids or their salts. There has been no precedent attempt before. In the present process, only the cells of the microorganism which have been previously cultivated are used. No nutrients or nitrogen sources necessary for growth of the cells are added. Much higher concentrations of sugar solutions may be converted than is possible in fermentation processes. Furthermore, it has been discovered that the reaction can be attained by mere aeration with air or oxygen and no addition of hydrogen acceptor is necessary.

This discovery is a great improvement over prior art processes because it eliminates the necessity of a hydrogen acceptor without eliminating its function and yet it does not require the addition of impurities which must later be removed as in fermentative processes. This process permits the production of extremely high yields of maltobionic and lactobionic acids from maltose and lactose at higher concentrations.

A further discovery is that the process of the present invention can not only be performed with aqueous solutions of reducing disaccharides such as maltose, lactose, etc., but may also be performed in the reactive solutions from which these disaccharides form. Thus, great simplification can be obtained not only by the direct high yield production of aldobionic acid directly from starch, but also in production time cutting.

It has furthermore been discovered that the present process is equally applicable to trisaccharides. Accordingly, mixed syrups of various aldonic acids, oligosaccharides and dextrins may be obtained. The organic acids usually added as chemicals to foodstuffs are citric acid, malic acid, fumaric acid, etc. While these additives mixed together and also blended with starch syrup, glucose, sugar or the like achieve enhanced effect as such, they also add considerably to the food cost. With this in view, another object of the present invention is the preparation of syrups which combine the sourness of organic acids and sweetness and viscosity of starch syrups by using various starch syrups as sweetener for foods and oxidizing low-molecular-weight oligo-saccharides contained in those starch syrups, that is, oxidizing glucose, maltose, maltotriose, etc. to aldonic acids, thereby obtaining mixed syrups of various aldonic acids, oligosaccharides and dextrins.

It has also been discovered that trisaccharides may also be fermentatively oxidized to trionic acids. When the oxidizing effects of certain Pseudomonas bacteria were studied, it was found that when cultured on starch syrups as media, satisfactory oxidation of disaccharides and trisaccharides to bionic and trionic acids occurred. Similarly using only cells of microorganisms productive of such a dehydrogenase without hydrogen acceptor and in conditions which will not sustain growth of such cells, enzymatic oxidation is possible. Such enzymatic oxidation can also be attained on a commerical scale by adding the enzymes during the process of producing the starch syrups.

According to this embodiment of the invention, products which combine the sourness of organic acid, sweetness and flavor of oligosaccharides, and viscosity of dextrins are obtained by the use of starch syrups which are readily prepared through enzyme- or acid-conversion of starches. In particular, the products according to the present process which are made by the oxidation of starch syrups containing glucose, maltose and maltotriose cost merely about one-twentieth of the prices of conventional products and, moreover, they can be mass-produced.

Aside from the advantageous features above described, it is also to be noted that the products prepared by whatever procedure in compliance with this invention are not single organic acids but mixtures of several aldonic acids, oligosaccharides, and dextrins, and therefore their flavors have added "body" and "roundness" or "mildness."

Third, products containing gluconic acid as the chief ingredient or which are composed essentially of bionic and trionic acids may be obtained from chosen kinds of starch sugars, that is, sugars having high glucose or maltose contents. Accordingly, the sweetness of oligosaccharides and viscosity of dextrins may be combined in diversified proportions to give products of different flavors.

Fourth, the products, which are not simple organic acids, confer viscosity on foods, improve their texture and give additional weight and volume thereto.

And fifth, unlike in culture (fermentation process), the sugar concentration for the enzymatic reaction may range from 20 to 30 percent to a great industrial advantage.

Dehydrogenase forming strains that can be used according to this invention include gluconic acid producing strains, fungi such as *Penicillium* genus, *Aspergillus* genus, and bacterias such as *Pseudomonas* genus, *Acetobacter*, *Gluconobacter*, etc., while the presence of amylases that hydrolyze disaccharides and trisaccharides are unsuitable to produce aldonic acids as well as the presence of enzymes that produce 2-ketogluconic acid, 5-ketogluconic acid, etc. It has been found that *Pseudomonas* species, especially *Pseudomonas fragi* and *Pseudomonas graveolens* exhibited the best result. The latter is particularly suitable for the production of bionic acids. The latter two microorganisms may be found in many type culture collections and are catalogued in the Institute for Fermentation, Osaka, Japan, respectively, as IFO 3458 and IFO 3460.

The enzyme activity of such cells were defined and determined as follows. A mixture of 200 $\mu$mol of a phosphate buffer solution (pH 5.6), 20$\mu$mol of maltose, and 0.5$\mu$mol of sodium 2,6-dichloroindophenol, with the addition of an ultrasonic treatment cell suspension as an enzymatic fluid to be a total volume of 6.0 ml., was reacted at 30°C. for 10 minutes. The extinction coefficient of the reaction product with a light having a wavelength of 590 m$\mu$ was measured. The activity at the point where the decrement of the extinction coefficient reached 0.10 was considered as 10 units. When calculated on that basis, the activity of the product was between 130 and 150 units per milligram of the dry cell.

Production of high-yield, high purity bionic acids.

Oxidative reaction is performed by adding the enzyme-conting cells either in an aqueous disaccharide solution or in a reactive solution productive of disaccharides, with aeration or charging oxygen with agitation. This process can be performed with relatively high concentration of sugars of 10–30%. The reaction is also practiced under normal temperature and atmospheric pressure, preferably at 20°–50°C. Reaction at temperatures over 50°C. involves the risk of enzyme inactivation. The most suitable initial pH in the case of *Pseudomonas* is 5.0 – 8.0.

As the pH of the reactive solution and reaction speed decrease naturally on formation of aldobionic acids, desirable results can be obtained by adding suitable counteractive or counter-agents such as sodium carbonate or ammonia water. Accordingly, it is preferable to maintain pH around the neutral zone during reaction progress with additions of these counter-agents.

Following is described an example of adding dehydrogenase to a reactive solution in which disaccharides, for example, maltose are forming. As explained in the specification of U.S. Pat. application Ser. No. 735,988, now abandoned, the forming reaction of maltose is carried out with the coexistence of $\beta$-amylase, for example, enzymes produced by British Pat. No. 1,130,398 or *Bacillus polymxa* ATCC 8523, and alpha-1,6-glucosidase, such as enzymes produced by *Pseudomonas amyloderamosa*, in low D.E. 1.5 liquefied starch mixture, in concentration 10–25%. Optimum pH of *Pseudomonas* enzyme is 3.0 – 6.0. After 10–20 hours when decomposition into maltose has progressed to 50–70%, maltose dehydrogenase is added and agitation with aeration is initiated, maintaining pH 5.0 and temperature at 30°–40°C. Quickening the time for addition of these cells is improper as it would cause inactivation. Also, the temperature should be kept over 30°C. for completion of the reaction. Such method of adding the cells, containing dehyrogenase during glucosidase reaction results in reducing by half the total reaction period required for both reactions excluding procedures for separation and purification. Oxidative reaction is performed by adjusting the pH, and cooling the solution finally to 30°–35°C. so as to prevent inactivation of the enzyme.

The $\alpha$-1,6-glucosidases which may be used in this reaction are those produced by any one of the following strains:

| | | |
|---|---|---|
| *Escherichia intermedia* | ATCC | 21073 |
| *Pseudomonas amyloderamosa* | ATCC | 21262 |
| *Streptomyces diastatochromogenes* | IFO | 3337 |
| *Actinomyces globisporus* | IFO | 12208 |
| *Nocardia asteroides* | IFO | 3384 |
| *Micromonospora melanosporea* | IFO | 12515 |
| *Thermomonospora viridis* | IFO | 12207 |
| *Actinoplanes phillippinensis* | KCC ACT- | 0001 |
| *Streptosporangium roseum* | KCC ACT- | 0005 |
| *Agrobacterium tumefaciens* | IFO | 3058 |
| *Azotobacter indicus* | IFO | 3744 |
| *Bacillus cereus* | IFO | 3001 |
| *Erwinia aroideae* | IFO | 3057 |
| *Micrococcus lysodeikticus* | IFO | 3333 |
| *Leuconostoc mesenteroides* | IFO | 3426 |
| *Mycobacterium phlei* | IFO | 3158 |
| *Sarcina albida* | IAM | 1012 |
| *Sarcina lutea* | IFO | 3232 |
| *Serratia indica IFO* | | 3759 |
| *Staphylococcus aureus* | IFO | 3061 |
| *Lactobacillus brevis* | IFO | 3345 |
| *Lactobacillus plantarum* | ATCC | 8008 |
| *Leuconostoc citrovorum* | ATCC | 8081 |
| *Pediococcus acidilactici* | IFO | 3884 |
| *Streptococcus faecalis* | IFO | 3128 |
| *Aerobacter aerogenes* | ATCC | 8724 |
| *Corynebacterium sepedonicum* | IFO | 3306 |
| *Aeromonas hydrophila* | IFO | 3820 |
| *Flavobacterium esteroaromaticum* | IFO | 3751 |
| *Acetobacter suboxydans* | IFO | 3130 |
| *Vibrio metschnikovii* | IAM | 1039 |
| *Enterobacter aerogenes* | ATCC | 8724 |

The $\beta$-amylases which may be used in the present process include pure $\beta$-amylase obtained from wheat bran (British Pat. No. 1,130,398), those contained in soy bean and sweet potato, and $\beta$-type enzyme of *Bacillus polymyxa* (ATCC 8523).

Aldobionic acid solutions obtained by such a method are quite suitable for industrial production on a large scale because of the lack of impurities in the mediums, and its high concentration and ease of purification and concentration. There is a further savings in that no hydrogen acceptor need be added.

Further, compared to the yield of 75 – 77% as reported by F. H. Stodola et al, spura., a great theoretical yield improvement of pure aldobionic acids of 95–100% is attainable owing to the fact that no byproducts such as ketogluconic acid or pantoses, etc., are formed as in the cases of those fermentation methods using sugar mediums.

Example 1

One liter medium containing 50 g. of maltose, 10 g. of corn steep liquor, 2 g. of urea, 0.6 g. of monobasic potassium phosphate, 0.25 g. of magnesium sulfate (7 aq.), 20 g. of calcium carbonate, was sterilized and inoculated with *Pseudomonas graveolens* IFO 3460. Cultivation was carried out at 30°C. for 50 hours with mechanical agitation (400 rpm) and aeration 1 v.v.m. After completion of cultivation, cells were harvested from the culture broth by centrifugation and used as the enzyme source. Cells obtained from above culture broth had enzyme activity of 131 units /mg dried matter as determined by the method described hereinabove.

Maltose solution was oxidized using the above cells. Enzyme solution was adjusted to pH 6.50 and subjected to reaction under the conditions listed in Table I. The reactive solution with a sugar concentration of 10% was agitated with aeration at 30°C. for 21 hours.

TABLE I

| No | Maltose Mono-hydrate | Calcium Phosphate | Amount of Cells | Total Enzyme Activity | Reducing Sugar After 21 Hours |
|---|---|---|---|---|---|
| 1 | 10 g. | 1.5 g. | 0 mg. | 0 | 5.7 |
| 2 | 10 g. | 1.5 g. | 43 mg. | 5,633 | 2.1 |
| 3 | 10 g. | 1.5 g. | 86 mg. | 11,266 | 1.3 |
| 4 | 10 g. | 1.5 g. | 215 mg. | 28,125 | 0.1 |

When the reactive solution stated in No. 4 was identified by paper-chromatogram, with aniline hydrogen phthalate, no presence of residual sugar was observed and that is evidence of complete oxidation. The reaction mixture formed into free acid with cationic ion exchange resin and identified by paper-chromatogram showed formation of only maltobionic acid, and no other presence of acids besides gluconic acid or other acid was observed. Paper-chromatogram of the hydrolyzed solution exhibited the presence of only glucose as sugar, gluconic acid was the only acid detected. These determinations are proof that the obtained aldobionic acids are of extremely high purities. Calcium was removed from the mixture obtained by filtration, decoloration and concentration with cationic ion exchange. It was found by titration method that 95% of the theoretical yield converted into maltobionic acid.

Example 2

Cultivation at 30°C. for 50 hours was carried out on a medium with an addition of 10% maltose according to the procedure described in Example 1. Residual sugar was 1.5%. Cells obtained by centrifugation of the broth were used in the subsequent enzymatic reaction. After the supernatant was decolorized with active carbon, cations were removed by cation exchange resin, and removal of impurities by anion exchange resin (weak basic) was conducted to obtain a colorless and transparent liquor. On concentrating this liquor maltobionic acid was obtained. Paper-chromatogram test showed no presence of other acids or sugars and the yield was 93% of the theoretical yield.

Following the same oxidation method described in Example 1, to 10% of maltose solution, the above mentioned cells were added, reaction was almost cmpleted after 30 hours with 100 mg per 10 g. maltose. After purification with active carbon and ion exchange resin, maltobionic acid equivalent to 91% of the theoretical yield was obtained. The purity of the product was about 97%.

Example 3

To 20% maltose solution was added 200 mg. of the cells, obtained according to the method described in Example 1. The resultant mixture was incubated for 20 hours with agitation and aeration, pH adjusted to 6.0 automatically by pH controller. Alkali employed was sodium carbonate. Residual sugar was less than 2%. The resultant product was decolorized and purified with cationic ion exchange resin and thus a slightly yellow tinted sodium salt of the acid with concentration of 50% was obtained. The product yield was 95% of the theoretical yield.

Oxidation under the same conditions, adding 300 mg. cells to 30 g. of maltose, produced 4% of residual sugar and sodium salts with a purity of 95%. The yield was 90% of the theoretical yield.

Example 4

On testing 20% of maltose solution with theoretical amount of magnesium carbonate and ammonium hydroxide, according to the method of Example 3, there were obtained 91% of magnesium salt of the theoretical yield and 89% of ammonium salt, and their purities were both 98%.

Example 5

25% of sweet potato starch slurry was liquefied to D.E. 3.0%. The resultant liquefied starch solution was readjusted to pH 5.5 and incubated for 20 hours at 45°C. after addition of β-amylase and enzyme obtained from *Pseudomonas amyloderamosa* ATCC 21262. Maltose content was around 80%. While adjusting pH to 5.5 by suspension of sodium carbonate and cooling the mixture to 35°C., 20 mg. of the cells obtained according to Example 1, were added per gram starch and further incubated with agitation and aeration for 30 hours to reach 30° C. finally. Residual sugar was 4%. Paper-chromatographic determination showed that purity of the resultant product after active carbon purification was 90% of aldobionic acid and the remainder being organic acids, maltotrionic acid or maltotetraonic acid and oligosaccharides. Yield of the product was 92% of the theoretical.

Tests using many of the various alpha-1,6-glucosidase sources listed in this test were conducted according to the method described in this Example. In each case similar oxidation products were obtained.

Example 6

The cells which are products of Example 1 were added to 20% of lactose solution at the rate of 10 mg. per 1 g. lactose, the mixture was agitated with aeration for 30 hours at 30°C., pH adjusted prior to incubation with addition of calculated amount of calcium carbonate. The mixture, decolorized and purified at the stage of 1% of residual sugar, produced calcium lactobionate equivalent to 93% of theoretical amount. Also in this case hydrolysis of disaccharide or formation of other organic acid were not detected.

Example 7

Inoculation of strains of Pseudomonas graveolens IFO 3460 was performed on a sterilized medium that contained 10% of lactose, 1.0% of corn steep liquor, 0.2% of urea, 0.06% of monobasic potassium sulfate and 0.025% of magnesium sulfate (7 aq.), in a jar fermentor. Fermentation of the mixture was conducted at 25°C. for 100 hours. Aeration was maintained at a flow rate of an equivalent amount of air to culture broth per minute. A calculated amount of calcium carbonate was also added. Supernatant obtained by centrifugation of the culture broth was purified with active carbon and concentrated to obtain lactobionic acid with a yield of 85% of the theoretical amount. The separated cells were washed with water, and added again to 1 liter of 20% lactose solution. The used amount of cells was 10 mg. per 1 g. sugar. After aeration and agitation for 25 hours at pH 6.0, reactive solution with 0.5% of residual sugar was obtained. By decolorizing and purifying, 91% of the theoretical amount of lactobionic acid was produced. By purification with cationic and weak basic ion exchange resin, free acid was obtained, which was paper-chromatographically pure.

Production of Aldonic Acids from Starch Syrups

The starch sugars which are used in the practice of this embodiment may include starch syrups of various dextrose equivalent (D.E.) values prepared by conversion with acid or acid and enzyme of various starches of terrestrial and subterrestrial origins, e.g., starches of corn, waxy corn, amylomaize, wheat, glutinous rice, sago, tapioca, white potato, sweet potato, etc.; high-maltose syrups prepared from $\alpha$-, $\beta$-, gluc- and isoamylases ($\alpha$-1,6-glucosidases) used either singly or in combination; high-D.E. syrups; and other enzyme converted syrups. The decomposition rate or D.E. and sugar composition of a particular starch syrup are matters to be decided upon in view of the intended use of the syrup that is to contain the particular organic acids. For example, a product of a high D.E. value with large low-molecular-weight sugar content is suitable for an application where a high acidity is required. In the event where a particularly large acid content is desired, a product of a high D.E. value with a large glucose content, or an acid converted syrup of a high saccharinity, is suitable. Where the flavor is the principal consideration, high-maltose syrups having large disaccharide and trisaccharide contents are preferred. One of the high-maltose syrups suitable is any one of the syrups containing maltose and maltotriose of more than 60 percent. They are easily produced by liquefying a starch slurry with an acid or $\alpha$-amylase and then subjecting the liquefied starch to the action of pure beta-amylase (Great Britian Pat. No. 1,130,398) extracted from wheat bran. The glucose contents of the products are less than 10 percent.

The other of the high-maltose syrups suitable is any one of the high purity maltoses containing maltose and maltotriose of 70 to 98 percent. The process for preparation of such high purity maltoses, briefly stated, may be effected by the first step of high-temperature gelatinization of various starch slurries (as taught by U. S. Pat. Application Ser. No. 810359) now abandoned in favor of continuation-in-part application Ser. No. 238,608 or liquefaction with a liquefying enzyme (alpha-amylase) to a low D.E. value, and subsequently by the second step of saccharification with the addition of $\beta$-amylase and $\alpha$-1,6-glucosidase (isoamylase). The maltose content can be freely varied through the control of the reaction time as well as the amount of $\beta$-amylase to be added.

Oxidation of starch sugar by the enzyme in accordance with the present invention is carried out in the following manner. One of various starch syrups with a concentration of 10 to 30 percent is adjusted to pH 5 to 8, and the cell suspension adjusted to pH 6.5 is added at a rate of 15 to 25 mg. per gram of the starch sugar on the dry basis. With aeration at about 30°C. the mixture is vigorously agitated so that the oxidation proceeds. While the pH of the reaction solution is being neutralized with calcium carbonate, sodium hydroxide or the like, the mixture with pH 5 to 8 is allowed to continue the reaction. After the reaction at 30° to 40°C. for 20 to 40 hours, the residual sugar is almost exhausted. It has been found that, at this time, the addition of a coloring agent or the like to serve as a hydrogen acceptor mentioned in the literature is not essential for the progress of the reaction. Although a suitable sugar concentration for the purpose of culture is about 10 percent, it is possible to increase the concentration to 20 to 30 percent in the case of the enzymatic reaction to an advantage from the industrial viewpoint.

Under the identical conditions pullulan was decomposed with pullulanase ($\alpha$-1,6-glucosidase), and the resulting maltotriose was oxidized, and then the sample was separated by paper chromatography. The sample oxidized by culture or by enzymatic action was treated with a cation exchange resin to be a free acid. Assay of the resulting acid showed that the glucose and maltose contained in the starch syrup were completely oxidized to gluconic acid and maltobionic acid and that pure maltotriose and the maltotriose in the starch sugar were mostly oxidized to trionic acid. When the sample was examined for the sugar contents by paper chromatography, only a negligible amount of sugar was found out of the oxidized product of maltotriose. In the sample of oxidized starch syrup, there was no trace of residual sugar such as glucose or maltose, thus indicating that almost all of triose and other sugars containing less carbon atoms has been oxidized. The sugar solution either cultured or oxidized was deionized with a cation exchange resin, decolorized with active charcoal and concentrated under reduced pressure to a colorless, transparent product.

Next, the shortening of the processing period and the economic advantage of simultaneously carrying out the conversion of starch and the oxidizing reaction in accordance with the present invention was considered. By way of an example, manufacture of a high-maltose starch syrup may be described. Starch is liquefied by a liquefying amylase to a low D.E. value and is subjected to the action of β-amylase for the reduction of the viscosity. Next, as α-1,6-glucosidase, the enzyme produced by *Pseudomonas amyloderamosa* (ATCC No. 21262) which is stable to low pH is added, and the mixture is reacted at 45°C. for 15 to 20 hours. The reaction solution containing more than 70 percent maltose was kept at 35° to 40°C. and added an oxidizing enzyme and the mixture was subjected to aeration-agitation culture. In this way the oxidizing reaction of produced maltose can be effected. The reaction time required usually ranges from 30 to 40 hours, and during the period in which a high-maltose starch syrup is produced and the oxidation can also be completed. It was confirmed that in 20 hours after the addition of the oxidizing enzyme, the objective starch syrup containing gluconic acid and maltobionic and trionic acids can be produced. The product of this reaction was also analyzed by paper chromatography and it was found that trisaccharides and other sugars having less carbon atoms had been almost completely oxidized in the resulting syrup as well as in the product subjected to a two-step process of saccharification and oxidation. If the oxidizing enzyme is added while maltose is being produced sufficiently, a product containing straight-chain aldonic acids such as maltobionic and maltotrionic acids is obtained.

The products according to this invention which are obtained by oxidizing starch syrups containing 70 to 95 percent maltose can be produced especially in large quantities at a cost nearly one-thirtieth of the cost of a conventional product.

The discovery that, in the foregoing manner, oligosaccharides such as mono-, di- and trisaccharides can be enzymatically oxidized has enabled the manufacture of starch syrups containing various organic acids, either by culture, enzymatic reaction, or use of an enzyme in the course of saccharification of a syrup, and has thereby opened the way for production on an industrial scale.

Since the acid contents and the flavor of a starch syrup can be adjusted through the control of the maltose and maltotriose contents by the enzymatic action, it is possible to obtain a desirable flavor at will by controlling the contents of savory bionic and trionic acids as well as the acidity of the syrup as a whole. Thus, by the use of a high-maltose starch syrup or the like, a product containing 50 to 95 percent bionic and trionic acids can be obtained. When an ordinary starch syrup of high saccharinity is used, the resulting syrup has a combined gluconic acid and bionic and trionic acid content of over 50 percent.

The products prepared in the foregoing way contain oligosaccharides and various acids and are excellently palatable. With adequate viscosity originating from the oligosaccharides and dextrins contained, they can be used as food additives to best advantage.

Lastly, it should be noted from the standpoint of industrial production that, in the manufacture of starch syrups composed essentially of bionic and trionic acids from starch syrups having high maltose contents, the conventional process, or the process of preparing a high-maltose product by enzymatically decomposing a starch slurry with a malt enzyme, settling and separating the resulting dextrin with alcohol, and repeating recrystallization, is so expensive that the products lose commercial attraction, whereas the production of maltose syrups by the joint use of α-1,6-glucosidase and β-amylase in accordance with the present invention is beneficial in that the products obtained at cost generally comparable to that of an ordinary starch syrup contain as much as 70 to 95 percent of maltose, and the oxidized products exceptionally have commercial values. The present invention is illustrated by the following examples.

Example 8

Biochemical oxidation of maltose.

Purified corn starch was adjusted to pH 5.0 and a concentration of 25 percent and heated at 160°C. with agitation to a homogeneous, viscous gelatinized solution (D.E. 20). The solution was rapidly cooled at 50°C., 25 units of the α-1,6-glucosidase produced by a strain of genus *Lactobacillus* (*Lactobacillus brevis* IFO 3345) was added, and after one hour of agitation, the fluid was cooled to 45°C. With the addition of 20 units of β-amylase to each gram of the starch, the mixture at pH 6.0 was reacted for 40 hours. The resulting fluid was purified and decolored, and thereby an oxidation sample was prepared. Similar results were obtained by the use of α-1,6-glucosidases produced by other strains than the *Lactobacillus* bacteria. Also, when the β-amylase and α-1,6-glucosidase were added in a different order or at the same time, the results were the same as above. When the enzymes were combined with an acid, α-amylase and the like, starch syrups of many diverse compositions were produced (as described in the specification of U.S. Pat. application Ser. No. 810374) now abandoned.

To each 100 grams of sugar on the dry basis of the saccharified solution were added 10 ml. of corn steep liquor, 0.6 g. of $KH_2PO_4$, and 0.25 g. of $MgSO_4·7H_2O$, and the mixture was diluted with water to a total volume of 1000 ml. This aqueous solution was sterilized by heating at 120°C. for 10 minutes. To this solution were aseptically added 10 ml. of separately sterilized 20% urea solution and 25 g. of 3 dry-heat sterilized $CaCO_3$. The mixed solution was inoculated with *Pseudomonas graveolens* IFO 3460, which was then cultured in a jar fermenter at 30°C. with agitation at 400 rpm by an agitator an with equivalent aeration, for 70 hours. As a defoaming agent soy bean oil was used. On completion of the culture, the fluid was centrifuged to separate the cell and use as enzyme source. The supernatant fluid contained not more than 0.1 percent of reducing sugar and indicated that oxidation had been completed. The culture showed a final pH of 6.7 and a turbidity degree of 0.275. The amount of the cells obtained was about 2 grams in terms of a dry matter. The activity of the enzyme was 150 units per milligram of the dry cell.

The supernatant fluid of the culture fluid after centrifuging was decolorized with active charcoal, freed of positive ions by a strongly acidic ion exchange resin (Amberlite IR 200) and freed of negative ions by a weakly basic exchange resin, and then concentrated under reduced pressure. A slightly yellowish syrup resulted. The solid yield was 93 percent, and the product had a slight, refreshing sourness. Separate estimation by paper chromatography of the materials showed that the initial composition consisted of 1.8 percent glucose, 90 percent maltose, 5.5 percent maltotriose, and 2.7 percent the other oligosaccharides. The paper chromatogram of the product was obtained in the following way. For the gluconic acid, maltobionic acid, maltose and glucose, the purified solution was spotted in one milligram portions on the dry basis. With a spreading agent of butanol, pyridine and water at a mixing ratio of 6:4:3, triple-layer spreading was effected at 25°C. by the ascending method. For the detection of sugars, aniline hydrogen phthalate were used as color developers. The reaction solution was practically free from maltose, glucose and maltotriose and had only small remnants of oligosaccharides. For the detection of organic acids, a 0.05% alcohol solution of bromophenol blue was used. Spots showed a small maount of gluconic acid and preponderance of bionic acids with underlying trionic acids. This meant that the sugars were not hydrolyzed and only the oxidation of the sugars proceeded. Thus, the products are mixtures of straight-chain aldonic acids composed principally of bionic and trionic acids.

Example 9

Enzymatic oxidation of maltose

Sweet potato starch was purified and adjusted to a concentration of 25 percent and to pH 6.0. Commercially available liquefying enzyme was added at a rate of 0.2 percent per gram of the starch, and the starch was liquefied at a high temperature of 90°C. A starch solution of D.E. 1.5 resulted. This solution was rapidly cooled at 60°C. and β-amylase extracted from wheat bran (Great Britain Pat. No. 1,130,398) was added at a rate of 20 units per gram of the starch. The mixture was agitated for 1 hour. After the viscosity of the mixture was decreased, the α-1,6-glucosidase produced by a *Nocardia* strain (*Nocardia asteroides* IFO 3384) was added at a rate of 25 units per gram of the starch. With stirring, the mixture was allowed to cool down to 45°C. in 35 hours. The sugar solution thus obtained comprised 90 percent maltose, 5.6 percent maltotriose, and 1.8 percent glucose. This saccharified solution was decolorized, purified and concentrated to a 30 percent sugar solution for use as an oxidation sample. For the oxidation of this sugar solution, the cell obtained in accordance with Example 8 was added at a rate of 20 mg. per gram of the maltose. At 30°C. the solution was reacted with vigorous shaking for 30 hours. Since the production of acids is accompanied by a drop of pH, calcium carbonate was added at a rate of 0.2 g. per gram of the maltose. The course of reaction was recorded in such a manner that a little amount of the reaction solution was sampled and the residual direct reducing sugar and total sugar were determined and the point where the residual direct reducing sugar dropped to not more than 0.3 percent was regarded as the terminating point. Upon completion of the reaction, the fluid was purified and desalted with active charcoal and an ion exchange resin in the same manner as described in Example 8. After concentration, a product similar to the one in the preceding example was obtained at a yield of 95 percent of the theoretical value. The product was a colorless, clear syrup with a concentration of 75 percent.

Example 10

A syrup containing 1.1 percent glucose, 77 percent maltose and 10.1 percent maltotriose was diluted to a concentration of 10 percent, and was inoculated with one percent of seed bacteria of *Pseudomonas graveolens* cultured under the same conditions as in Example 8 at 30°C. for 24 hours, and aeration culture, was carried out in a jar fermenter. After 40 hours the residual sugar reached 0.3 percent, when the cultivation was discontinued and the cell was centrifuged. The supernatant fluid was desalted and decolorized with active charcoal and an ion exchange resin and concentrated under reduced pressure. An almost colorless syrup was obtained. The yield of the anhydride was 91 percent of the anhydride material. Paper chromatography showed that there remained no glucose and maltose but the presence of some triose and other oligosaccharides was observed. As regards acids, there were indications of acids in the positions normally occupied by gluconic and maltobionic and trionic acids. From these it was concluded that the product was a viscous syrup as a mixture of low-molecular-weight oligosaccharides and aldonic acids. The total yield of acids in terms of the number of titration was 90 percent of the theoretical amount of the glucose, maltose and maltotriose of the raw material.

Example 11

β-Amylolysis of liquefied starch and enzymatic oxidation

Sweet potato starch slurry was adjusted to a concentration of 20 percent and pH 6.0 and was liquefied by the addition of 0.2 percent of a liquefying enzyme at 90°C. The homogeneously liquefied solution of D.E. 20 was cooled at 50°C. and the pH was adjusted to 6.0. Five units of β-amylase obtained from wheat bran was added to each gram of the material starch, and the solution was agitated until the viscosity dropped. Then, 7 units of the α-1,6-glucosidase obtained by culturing *Escherichia intermedia* (ATCC 21073) and 5 units of the liquefying enzyme were added to each gram of the material starch, the mixture was reacted at 45° to 50°C. for 18 hours. The maltose content at the time was analyzed to be 74 percent. To this reaction solution was added the cell of *Pseudomonas graveolens* obtained in accordance with Example 10 at a rate of 20 mg. per gram of the starch. Also, 2 g. of calcium carbonate was added, and the mixture was agitated with aeration at 35° to 40°C. In about 18 to 20 hours direct reducing sugar was decreased to almost zero, and the reaction was stopped. After centrifugal removal of the cell, the fluid was decolorized and deionized with a cation exchange resin and active charcoal in the same manner as described in the preceding example, and then was concentrated. The sample so obtained was analyzed by paper chromatography and alkali titration. The results were practically the same as in Example 10. The maltobionic acid content was 75 percent of the material starch and the trionic-acid content was about 8 percent, and, considering the sugar loss due to the purification, it appeared that the maltose content of the reaction mixture was increased to 77 to 78 percent during the reaction and oxidized to the bionic acid.

The aldonic acid mixture thus obtained had palatable sourness and light viscosity and was suitable as an addition agent to foodstuffs.

Example 12

Enzymatic oxidation of high-maltose starch syrup

A commercially available high-maltose syrup (consisting of 6 percent glucose, 49 percent maltose, 13 percent maltotriose, and 33 percent dextrin) was diluted to a concentration of 15 percent, and the cell of *Pseudomonas graveolens* obtained in accordance with Example 10, was added at a rate of 25 mg. per gram of the sugar anhydride. The mixture was vigorously agitated with aeration at 30°C. for 21 hours. The pH was neutralized with calcium carbonate. In the same manner as described in the preceding example, the resultant was purified and desalted. A syrup containing 61 percent free acids (as bionic acids) resulted. The yield was 95 percent on the basis of the material anhydride. The solution concentrated to 50 percent was a non-crystalline, slightly viscous syrup which had sourness and slight sweetness.

Example 13

Enzymatic oxidation of acid converted syrup

A commercially available acid converted syrup (with D.E. 50, composed of 26 percent glucose, 16 percent maltose, and 13 percent maltotriose) was diluted to a concentration of 15 percent. Then, in the same manner as in Example 9, an oxidizing enzyme (cell) was added at a rate of 22 mg. per gram of the starch, and the mixture was agitated with aeration at 30°C. for 21 hours and the reaction was discontinued when the reducing sugar decreased to 0.5 percent. The resultant upon purification afforded a colorless syrup with an anhydride yield of 51 percent on the basis of the material anhydride. It was a viscous syrup containing 76 percent bionic acids. With sourness harmonized with sweetness and also with adequate viscosity, the product was suitable for addition to foodstuffs.

Example 14

Biochemical oxidation of high D.E. starch syrup of commerce

A commercially available acid converted syrup which was purified by ion exchange (to D.E. 70, consisting of 46 percent glucose, 22 percent maltose, and 12 percent maltotriose) was diluted to a concentration of 10 percent as a carbon source, and *Pseudomonas fragi* IFO 3458 was cultured on the syrup in the same manner as described in Example 8. After aeration culture at 30°C. for 50 hours, the residual sugar decreased to 1.5 percent, when the cultivation was discontinued. The supernatant fluid was desalted and decolored and then concentrated in vacuum. The colorless liquid thus obtained contained 90 percent anhydride on the basis of the material starch. Paper chromatography for the detection of aldonic acids showed that the product contained gluconic acid and maltobionic and trionic acids. As sugars, considerble amounts of oligosaccharides remained. The product was a liquid having agreeable sourness.

Example 15

Enzymatic oxidation of high D.E. starch syrup of commerce

A commercially available high-saccharinity starch (D.E. 70) was diluted to a concentration of 30 percent, and, with the addition of 25 mg. of the cell separated in Example 14 to each gram of the starch anhydride, the mixture was agitated with aeration at 30°C. for 21 hours. The oxidized produced were neutralized with diluted sodium hydroxide. Upon completion of the reaction, the resultant was desalted and decolorized and then concentrated in vacuum. A colorless syrup was obtained at a yield of 92 percent. Analysis showed the same results as in Example 14.

What is claimed is:

1. A process for preparing aldonic acids including maltotrionic acid from oligosaccharides containing maltose and maltotriose, comprising:
   culturing dehydrogenase-productive strains of *Pseudomonas graveolens* or *Pseudomonas fragi* with aeration in a culture medium containing an aldose and sufficient nutrients for the growth of said strain;
   separating the cells of said strain from said culture medium;
   contacting said oligosaccharides with said separated cells with aeration without the further addition of a compound which acts as a hydrogen acceptor in the presence of a dehydrogenase enzyme and without the addition of nutrients necessary for the growth of said cells; and
   recovering the aldonic acids produced in said contacting step.

2. A process in accordance with claim 1 further including, prior to said contacting step, the step of:
   producing said oligosaccharides by acid or enzyme hydrolysis of starch.

3. A process in accordance with claim 1 wherein said cells are added at a rate of 15 to 25 mg. per grams of oligosaccharides on the dry basis.

4. A process in accordance with claim 1 further including the step of:
   hydrolyzing a starch solution with enzymes to produce said oligosaccharides;
   wherein said contacting step is performed simultaneously with said hydrolyzing step to perform simultaneous hydrolysis and oxidation.

5. A process in accordance with claim 4 for preparing a syrup composed principally of maltobionic and maltotrionic acids wherein said hydrolyzing step comprises treating said starch solution with β-amylase.

6. A process in accordance with claim 1 wherein said oligosaccharides is in the form of an aqueous solution of 10–30% concentration.

7. A process in accordance with claim 6 wherein said contacting step is performed at a temperature of 20° – 50°C. and atmospheric pressure, with a pH of 5.0 – 8.0.

* * * * *

UNITED STATES PATENT OFFICE
CERTIFICATE OF CORRECTION

PATENT NO. : 3,862,005
DATED : January 21, 1975
INVENTOR(S) : Toshio MIYAKE et al.

It is certified that error appears in the above-identified patent and that said Letters Patent are hereby corrected as shown below:

Col. 1, line 34, "J Biological Chemistry" should be italicized.

Col. 1, line 35, "Pseudomonas" should be italicized.

Col. 1, line 53, "J. Biological Chemistry" should be italicized.

Col 10, line 43, delete "an with" and insert --and with--.

Col. 11, line 10, delete "maount" and insert --amount--.

Signed and sealed this 24th day of June 1975.

(SEAL)
Attest:

RUTH C. MASON
Attesting Officer

C. MARSHALL DANN
Commissioner of Patents
and Trademarks